US012457248B2

(12) United States Patent
Ghosh

(10) Patent No.: US 12,457,248 B2
(45) Date of Patent: Oct. 28, 2025

(54) GEOFENCING IOT EDGE APPLICATION VIRTUALIZATION

(71) Applicant: International Business Machines Corporation, Armonk, NY (US)

(72) Inventor: Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 17/652,500

(22) Filed: Feb. 25, 2022

(65) Prior Publication Data

US 2023/0275930 A1 Aug. 31, 2023

(51) Int. Cl.
*H04L 9/40* (2022.01)
*H04W 4/021* (2018.01)

(52) U.S. Cl.
CPC ........... *H04L 63/205* (2013.01); *H04W 4/021* (2013.01)

(58) Field of Classification Search
CPC ............................ H04L 63/205; H04W 4/021
See application file for complete search history.

(56) References Cited

U.S. PATENT DOCUMENTS

| | | | | |
|---|---|---|---|---|
| 8,781,500 B1 * | 7/2014 | Dekel | ............... | H04M 1/72457 455/412.2 |
| 9,392,406 B2 * | 7/2016 | Houri | .................... | H04W 4/025 |
| 9,501,304 B1 | 11/2016 | Judson | | |
| 9,781,602 B1 | 10/2017 | Girdhar | | |
| 2007/0243627 A1 | 10/2007 | Takayama et al. | | |
| 2011/0208797 A1 * | 8/2011 | Kim | ....................... | H04L 67/131 709/225 |
| 2012/0284769 A1 * | 11/2012 | Dixon | .................... | H04W 4/021 726/1 |
| 2016/0021502 A1 * | 1/2016 | Kim | ........................ | H04W 4/02 455/456.1 |
| 2016/0169696 A1 * | 6/2016 | Butts, III | ............ | G01C 21/3461 701/438 |
| 2017/0068318 A1 | 3/2017 | Mcclure et al. | | |
| 2017/0289806 A1 * | 10/2017 | Girdhar | ................. | H04W 12/64 |
| 2021/0211831 A1 * | 7/2021 | Gan | ........................ | G06N 20/00 |

OTHER PUBLICATIONS

Morabito, Roberto, "Virtualization on Internet of Things Edge Devices with Container Technologies: a Performance Evaluation", IEEE Access, vol. 5, May 17, 2017, 16 Pages.

(Continued)

*Primary Examiner* — Mohamed A. Wasel
(74) *Attorney, Agent, or Firm* — Edward J. Wixted, III

(57) ABSTRACT

In an approach for lightweight application virtualization based on policies defined by overlaying geofence for an edge computing architecture, a processor collects real-time data of one or more geofences of a specified geospatial area. A processor determines a hierarchy of the one or more geofences based on the collected real-time data. A processor determines applicable set of geofence policies based, at least in part, on the hierarchy of the one or more geofences. A processor generates edge-based policies for an edge device based on the applicable set of geofence policies. A processor creates corresponding orchestration protocols on the edge device based on the edge-based policies.

20 Claims, 4 Drawing Sheets

(56) References Cited

OTHER PUBLICATIONS

Sechkova et al., "Secure location-aware VM deployment on the edge through OpenStack and ARM TrustZone", 2019 European Conference on Networks and Communications (EuCNC), Jun. 18-21, 2019, Valencia, Spain, 5 Pages.

Taherizadeh et al., "A Capillary Computing Architecture for Dynamic Internet of Things: Orchestration of Microservices from Edge Devices to Fog and Cloud Providers", Sensors, Sep. 4, 2018, 24 Pages.

* cited by examiner

GEOFENCING IOT EDGE APPLICATION VIRTUALIZATION

BACKGROUND OF THE INVENTION

The present invention relates generally to the field of edge computing, and more particularly to lightweight application virtualization based on policies defined by overlaying geofence(s) for an edge computing architecture.

A geofence is a virtual perimeter for a real-world positioning or geographic area. A geofence can be dynamically generated—as in a radius around a point location, object, or asset—or a geofence can be a predefined set of boundaries—such as school zones or neighborhood boundaries.

In a general computing environment with a cloud, edge nodes, and edge devices, the cloud (i.e., data centers, servers, databases, storage) would be at the center with edge nodes (i.e., routers, switches, small/macro base stations) and then edge devices (i.e., user gadgets, e.g., mobile devices, wearable devices, game controllers, etc.). High latency network congestion and network bottlenecks are some of the problems in cloud computing. Moving from a centralized to decentralized paradigm, edge computing could offload the processing to edge nodes and/or edge devices, which indirectly reduces application response time and improves overall user experience.

A container is a standard unit of software that packages up code and all its dependencies, so the application runs quickly and reliably from one computing environment to another. A DOCKER® container image is a lightweight, standalone, executable package that includes everything needed to run an application—code, runtime, system tools, system libraries, and settings. Microservices contain everything from the operating system, platform, framework, runtime and dependencies, packaged as one unit of execution. Containers encapsulate discrete components of application logic provisioned only with the minimal resources needed to do their job.

Container deployment is a method for quickly building and releasing complex applications. DOCKER® container deployment is a popular technology that gives developers the ability to construct application environments with speed at scale. Container deployment is the action of putting containers to use. The deployment of containers uses management software that simplifies the launch and updates of applications. Container deployment provides fast access to environments and speeds up development because secure containers can be quickly downloaded and used.

SUMMARY

Aspects of an embodiment of the present invention disclose a method, computer program product, and computer system for lightweight application virtualization based on policies defined by overlaying geofence(s) for an edge computing architecture. A processor collects real-time data of one or more geofences of a specified geospatial area. A processor determines a hierarchy of the one or more geofences based on the collected real-time data. A processor determines applicable set of geofence policies based, at least in part, on the hierarchy of the one or more geofences. A processor generates edge-based policies for an edge device based on the applicable set of geofence policies. A processor creates corresponding orchestration protocols on the edge device based on the edge-based policies.

In some aspects of an embodiment of the present invention, the real-time data includes coordinates of the one or more geofences, a type of each of the one or more geofences, installed policies for each of the one or more geofences, number of edge devices within each of the one or more geofences, and data exchange aspects related to each edge device.

In some aspects of an embodiment of the present invention, at least one of the one or more geofences overlaps another one of the one or more geofences.

In some aspects of an embodiment of the present invention, the hierarchy is further based on an arrangement of the one or more geofences and a precedence key associated with the one or more geofences, otherwise a default precedence is assumed based on the arrangement of the one or more geofences.

In some aspects of an embodiment of the present invention, the edge-based policies define dynamic containerization of applications and functionality specific to the one or more geofences the edge device is located within.

In some aspects of an embodiment of the present invention, a processor dynamically conducts fault and performance diagnosis of the edge device and corresponding applications based on the created orchestration protocols for the edge device.

In some aspects of an embodiment of the present invention, a processor dynamically enables autonomous deletion of the edge device and application of the edge device when the edge device is moved out of at least one of the one or more geofences or when at least one of the one or more geofences are dynamically dropped.

DETAILED DESCRIPTION

Figure 1A:
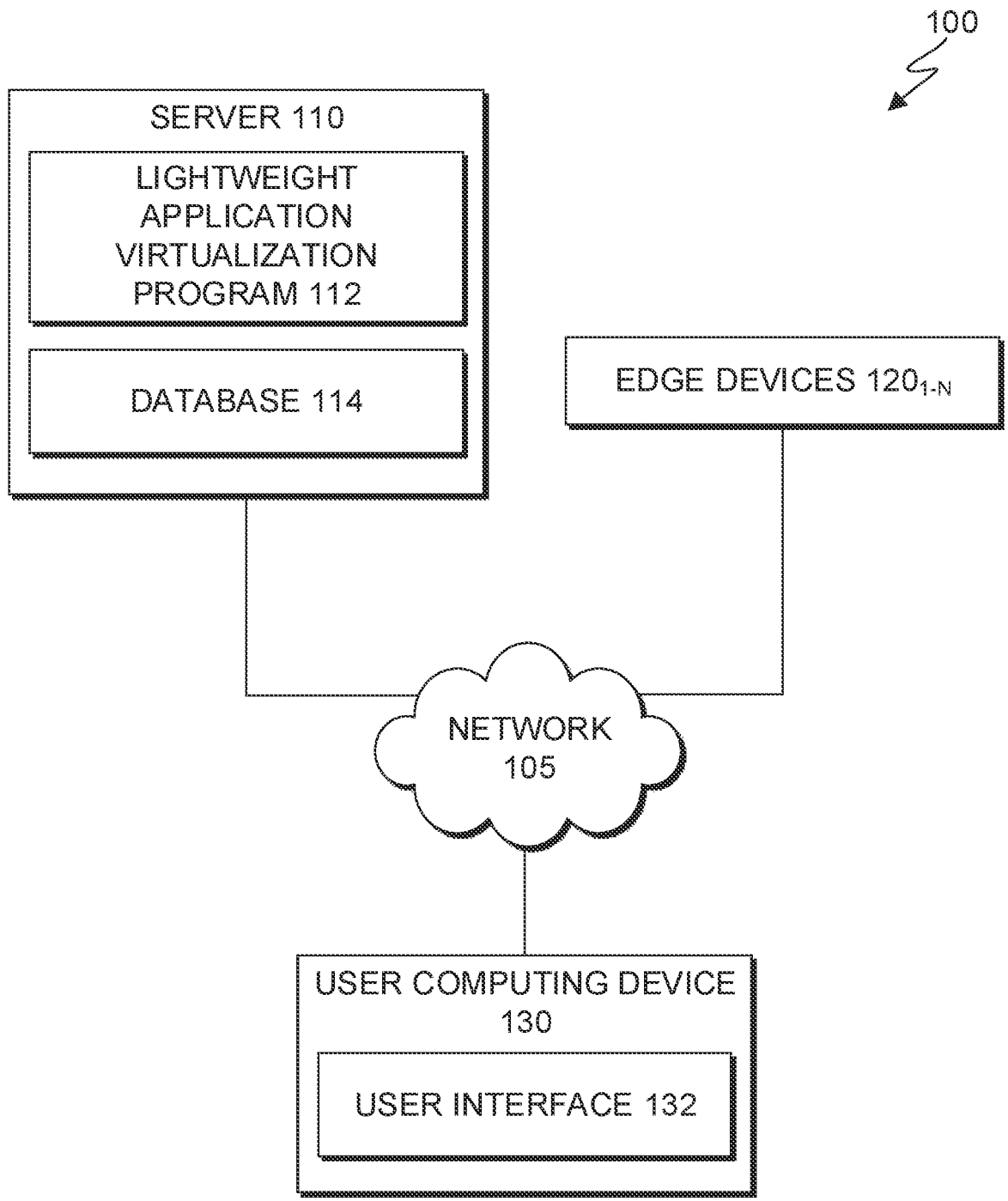
FIG. 1A is a functional block diagram illustrating a distributed data processing environment, in accordance with an embodiment of the present invention.

Embodiments of the present invention recognize that the world of smart devices has led to the rise in usage of IoT edge devices, in which each device is enabled to handle multiple and diverse heterogenous operations and applications. For example, an edge robotic arm that is used for multiple applications in an industrial spatial area. In an assembling area, the edge robotic arm is involved in welding and drilling. In a warehousing area, the edge robotic arm is used in material handling, stacking, and grading. In a painting area, the edge robotic arm is used for thermal spraying and painting. Thus, an edge device's applications can be various and diverse, and so can its programming, intelligence, device events, device-device collaboration, and data sharing in a heterogenous industrial environment.

Edge computing shifts the paradigm from centralized to decentralized by utilizing compute, network, and storage resources that are closer to the user. Edge computing pushes the content and service away from the center nodes, e.g., datacenter or cloud, to the logical extremes of a network. Edge computing aims at reducing response time, or latency, by caching or offloading content to the edges. By running content from the edges, edge computing creates potential new service categories and new unexplored business models. Some of the potential new services are location-based, IoT-based, data caching, big data, and sensor monitoring activities. The presence of the edge computing layer aids in offloading data processing and validation to the edge layer. Moreover, edge computing facilitates implementation of collaborative computing among end-devices as well as implementation of device and data management policies. Thus, in order to improve the end-user experience (e.g., accessing requested content in a shorter time), embodiments of the present invention recognize the need to push some computations closer to these edge devices.

Embodiments of the present invention recognize that preloading one edge device with multiple applications and functionalities based on diverse work items, locations, and usages causes overhead for the device, hardware, processing, and edge computing performance. Considering geofenced boundaries with policies installed, the variety of possible mechanisms, protocols, and hardware has become a hindrance for edge devices and architectures trying to enable secure and governed data exchange while extracting services from an underlying communication subsystem.

Embodiments of the present invention provide a program for lightweight application virtualization based on policies defined by an overlayed geofence in an edge computing environment. Embodiments of the present invention provide modularity combined with orchestration supplied by DOCKER® to simplify management of IoT edge environments and enables distributed deployments creating a highly dynamic system for running IoT edge applications at different architecture layers.

Edge device layers are heterogeneous in terms of their hardware specifications, processor architecture, and operating systems running on the devices. Thus, lightweight virtualization in the form of containerization offers suitable solution to concerns addressed above. Containerization offers the flexibility to develop different services in different programming languages and communication among the containers using well-defined application programming interfaces (APIs).

Based on applied geofenced policies, embodiments of the present invention enable a policy engine to dynamically inherit geofenced policies for creating container images and their corresponding orchestration protocols, in which the policies provide control over interfaces of a device (e.g., reading and writing to the device) as well as execution of methods offered by the device. Policies are rules or constraints that provide much finer control over deployment placement of edge services by edge node owners, service code developers, and deployment owners. Policies are used to describe where a service can be run, if it requires a particular hardware setup (such as CPU/GPU constraints), memory constraints, specific sensors, actuators, or other peripheral devices. A policy is expressed through a flexible language that is applied to models, nodes, services, and deployments.

Based on a hierarchy of multi-layered or overlapping geofences and corresponding policies, embodiments of the present invention create templated DOCKER® images and/or layered images where each layer contains a set of orchestration protocols (e.g., resource, security, sharing, configuration, authentication management, etc.), in which the image generation starts from an image referred to as the "base image" or the lowest in the geofence hierarchy. In a DOCKER®-based multi-container environment, each microservice has its own file system image generated using a "Dockerfile", which is a shell script, i.e., "recipe", to build, install, and run the service. To allow sharing content between containers and to speed up generation of images, DOCKER® uses layered images where each layer contains a set of files adding, overwriting, or deleting files from the union of previous layers. The image generation starts from an image referred to as the "base image", followed by addition of build dependencies, build tools, build artifacts, runtime dependencies, and language runtimes. The overall size for all the images of all microservices can be significant.

Embodiments of the present invention enable dynamic container and data security for edge devices, edge nodes, and servers based on the security policies generated from one or more geofences (i.e., hierarchy, compliance, and overlapping policies of the one or more geofences) through addition or truncation of devices within a geofence for secure sharing of static data between edge devices, nodes, neighboring nodes and data centers.

Embodiments of the present invention ensure data gets collected and analyzed at the most efficient and logical places between the source and the cloud, balancing the load and pushing the computation and intelligence to the appropriate layers. Embodiments of the present invention conduct intelligent partitioning of a real-time IoT computing task into an optimal coordination of server-side processing and IoT object-side processing based on the policies defined by the geofence. This allows scaling real-time IoT service provisioning with a high degree of precision when IoT objects are on the move and enables resource aware and workload adaptive distribution of computation through careful coordination of IoT orchestration.

Embodiments of the present invention enable an orchestrating framework to dynamically determine portioning of vertical orchestration that centers on orchestrating the vertical stack of the IoT computing and communication ranging from hardware, device firmware, computer networking, and software defined networks, server virtualization, and cloud computing) and horizontal orchestration that focuses on leveraging the computational capacity of smart things at the edge of the IoT computing infrastructure (e.g., IoT computing tasks, capacity, etc. of the nodes, edge servers, and edge devices).

Embodiments of the present invention utilize a geofence-based orchestrator to dynamically conduct fault and performance diagnosis and tolerance to enable autonomous healing of edge devices. Its application comprising a plurality of microservices, wherein the system would detect performance degradation of an application and its corresponding microservice(s) and would dynamically route one or more of the microservice(s) to a previous version. Embodiments of the present invention would further analyze the components of the microservice(s), such as fix pack, software patches, non-functional requirement, libraries, etc., and hence determine the fault module that would be downgraded to a previous version.

Embodiments of the present invention enable self-destructing container based on boundaries of a geofence, wherein the portion of the edge device application container and its corresponding orchestration and storage data would dynamically be self-destructed based on the governance and provenance policies defined by the geofence.

Embodiments of the present invention enable, during configurable timed intervals, digital agreement and compliance between a node, service, and deployment policy, wherein a policy engine would search for nodes that have a compatible policy defined by the geofence. Embodiments of the present invention also analyze existing agreements to ensure the nodes remain compliant with the defined policy parameters. An agreement is in compliance when the node, service, and deployment policies that originally created the agreement remain in effect or when changes to one policy does not affect other policy compatibility. Based on the defined governance and provenance policies in the geofence, embodiments of the present invention employ blockchain smart contract based tracking and the storage of all the orchestration of activities between heterogeneous edge devices and/or combinations of nodes (joining and leaving IoT devices and network, policy compliance, dynamic placement and change of containers as software devices, provenance of sensor data, and other entities entering the processing system). Utilizing blockchains ensures data integrity using consensus-driven mechanisms to enable the verification of all the transactions in the network. Additionally, blockchains can strengthen the security of edge components in terms of the identity management and access control and prevent data manipulation.

A few security concerns addressed by embodiments of the present invention include: (1) recording the identity of all entities in the system, (2) recording the provenance of sensor data and other entities entering the processing system, and (3) recording the fact that certain processing steps (in the form of smart contracts) have actually been carried out. Blockchain technology is employed to manage these security concerns by recording the above information in a tamper-proof way to create trust. Thus, embodiments of the present invention propose a conceptual reference architecture that enables secure, trustworthy processing of IoT edge architectures.

Using artificial intelligence (AI) and historical edge computing data, gateway data, and cloud data, embodiments of the present invention dynamically create testbed platforms for testing new applications and network protocols in IoT systems and network, as well as new devices.

Implementation of embodiments of the invention may take a variety of forms, and exemplary implementation details are discussed subsequently with reference to the Figures.

FIG. 1A is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, edge devices $120_{1-N}$, and user computing device 130, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, edge devices $120_{1-N}$, user computing device 130, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with edge devices $120_{1-N}$, user computing device 130, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes lightweight application virtualization program 112 and database 114. Server 110 may include internal and external hardware components, as depicted and described in further detail with respect to FIG. 3.

Lightweight application virtualization program 112 operates as a method for lightweight application virtualization based on policies defined by overlaying geofence for an edge computing architecture enabling geofenced edge application deployment. In the depicted embodiment, lightweight application virtualization program 112 is a standalone program. In another embodiment, lightweight application virtualization program 112 may be integrated into another software product. lightweight application virtualization program 112 is depicted and described in further detail with respect to FIG. 2.

Database 114 operates as a repository for data received, used, and/or output by lightweight application virtualization program 112. Data received, used, and/or generated may include, but is not limited to, policies for each geofence and any other data received, used, and/or output by lightweight application virtualization program 112. Database 114 can be implemented with any type of storage device capable of storing data and configuration files that can be accessed and utilized by server 110, such as a hard disk drive, a database server, or a flash memory. In an embodiment, database 114 is accessed by lightweight application virtualization program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that lightweight application virtualization program 112 has access to database 114.

Edge devices $120_{1-N}$, in which N represents any number, represents one or more edge computing devices that, in a general computing environment, would be at the "edge" or boundary of a network and provides an entry point into the network, such as edge nodes (i.e., routers, switches, small/macro base stations) and then edge devices (i.e., user gadgets, e.g., mobile devices, wearable devices, game controllers, etc.). In general, edge devices $120_{1-N}$ represents one or more programmable electronic devices or combination of programmable electronic devices capable of executing machine readable program instructions and communicating with other computing devices (not shown) within distributed data processing environment 100 via a network, such as network 105.

User computing device 130 operates as a computing device associated with a user on which the user can interact with lightweight application virtualization program 112 through an application user interface. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105.

User interface 132 provides an interface between lightweight application virtualization program 112 on server 110 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enables a user of user computing device 130 to view and/or manage output of lightweight application virtualization program 112.

Figure 1B:
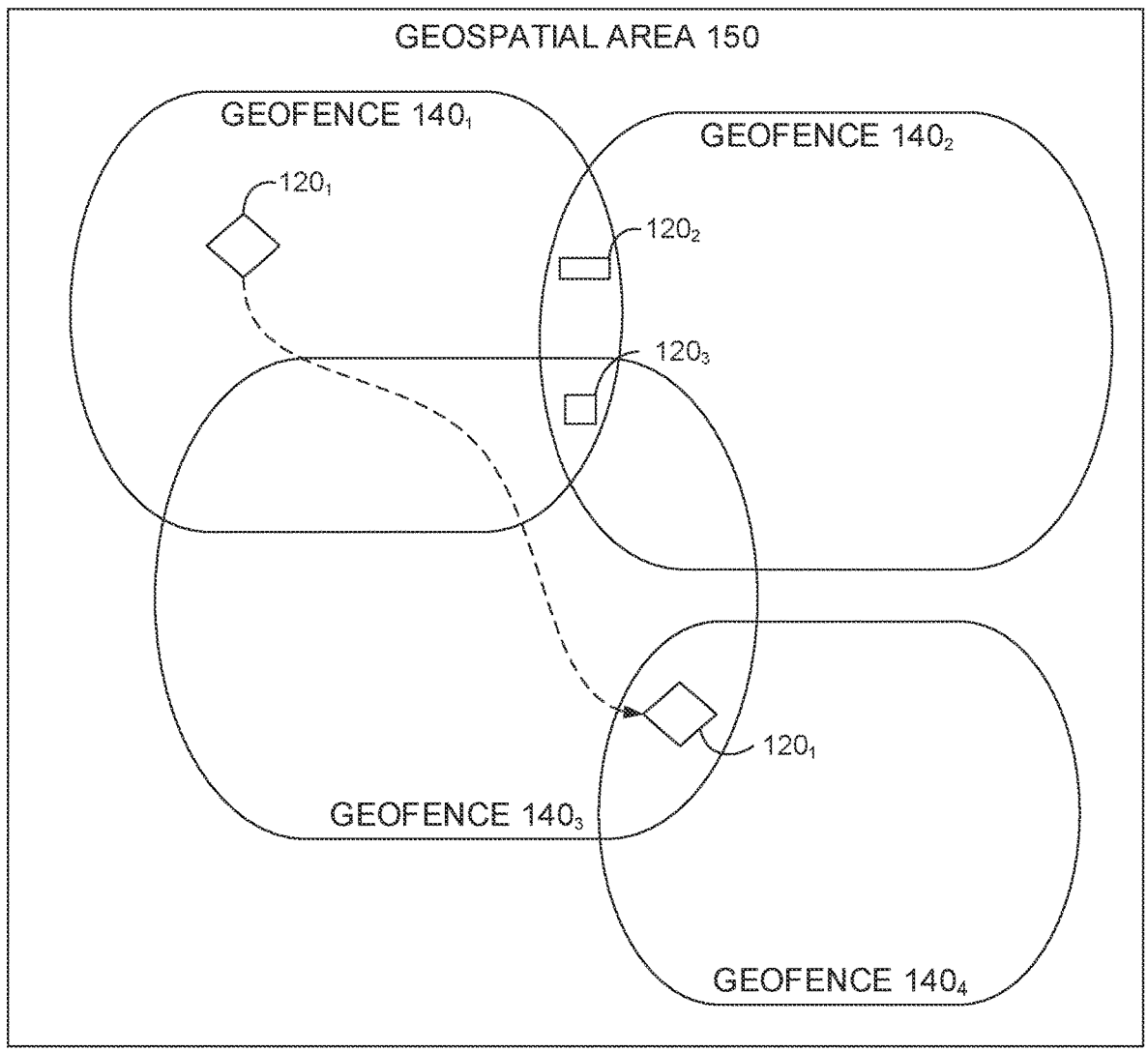
FIG. 1B is an example block diagram illustrating a geospatial area with edge devices and overlaying geofences, in accordance with an embodiment of the present invention.

FIG. 1B is an example block diagram illustrating geospatial area 150 with edge devices $120_{1-N}$ and overlaying geofences $140_{1-N}$, in accordance with an embodiment of the present invention. In the depicted embodiment, geospatial area 150 comprises geofences $140_{1-4}$ that overlap or layer one another in some way. In the depicted embodiment, the hierarchy of the geofences is geofence $140_1$, geofence $140_3$, geofence $140_4$, and geofence $140_2$, in descending order. This hierarchy controls the applicable policies for one or more edge devices within the one or more geofences. In the depicted embodiment, edge device $120_{1-3}$ are shown within geofences $140_{1-4}$, with edge device $120_1$ moving from within geofence $140_1$ to within geofence $140_3$ and geofence $140_4$. Edge device $120_2$ is within geofence $140_1$ and geofence $140_2$. Edge device $120_3$ is within geofence $140_1$, geofence $140_2$, and geofence $140_3$.

Figure 2:
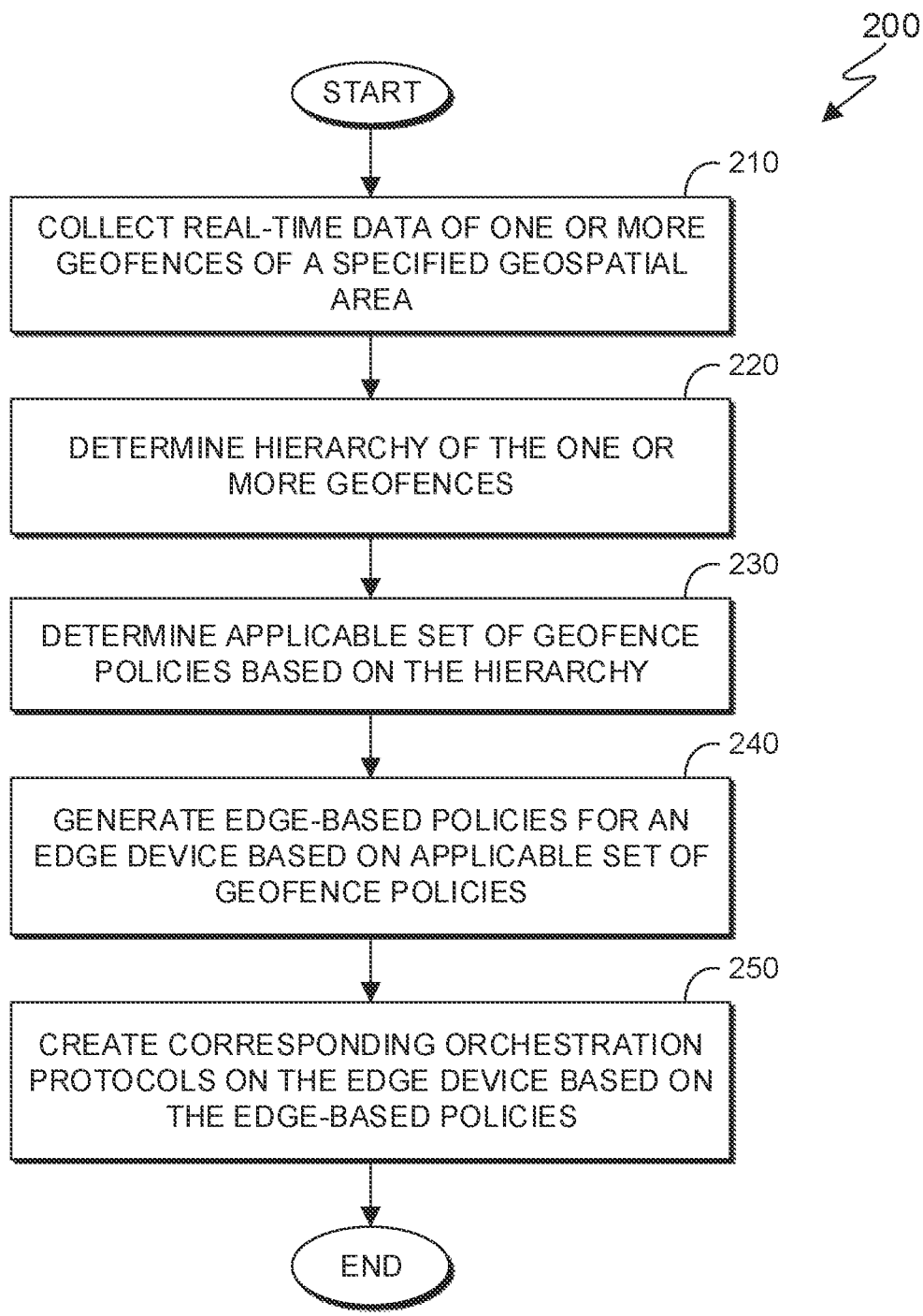
FIG. 2 is a flowchart depicting operational steps of a lightweight application virtualization program, for lightweight application virtualization based on policies defined by overlaying geofence(s) for an edge computing architecture, running on a server of the distributed data processing environment, in accordance with an embodiment of the present invention.
Figure 3:
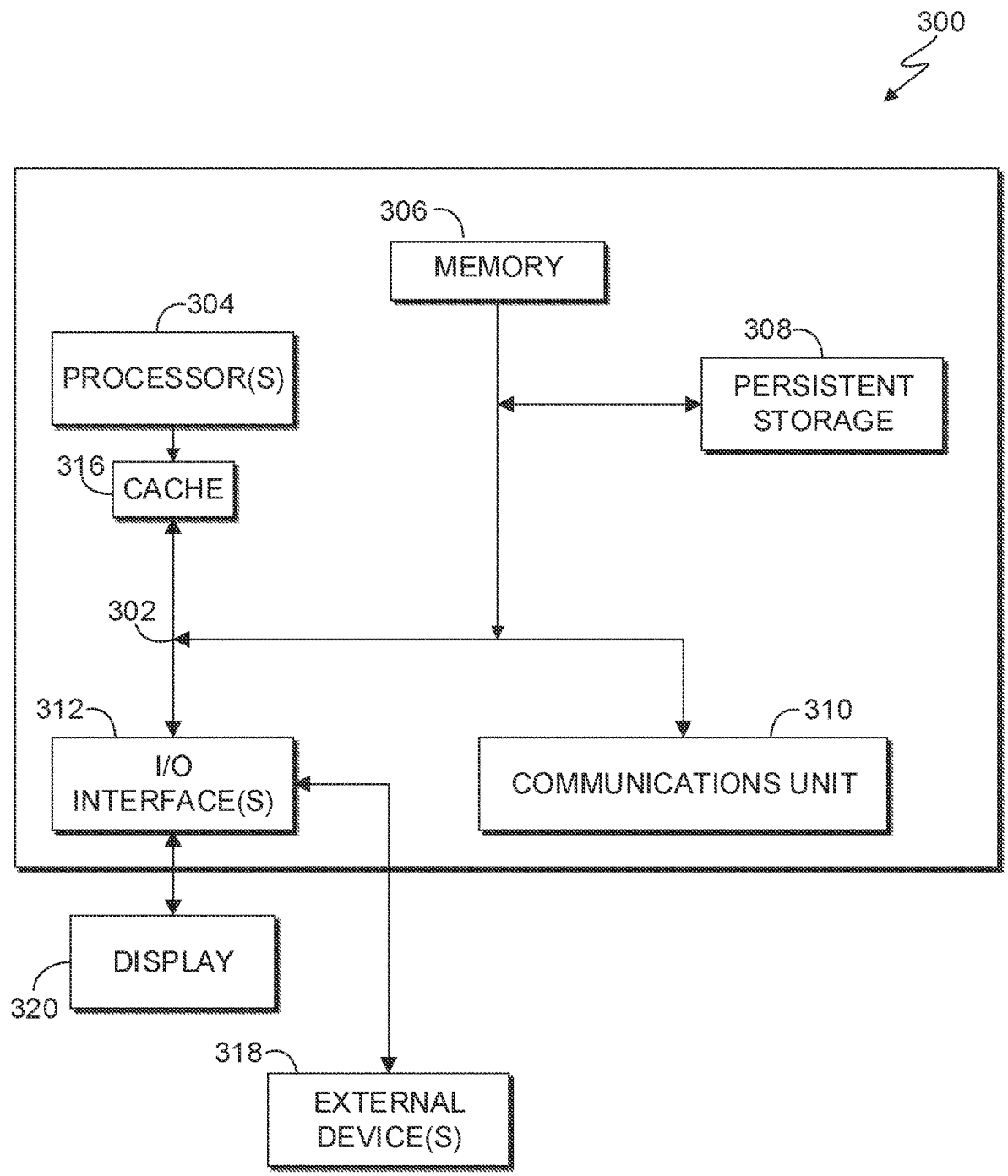
FIG. 3 depicts a block diagram of components of the server of the distributed data processing environment of FIG. 1, for running the lightweight application virtualization program, in accordance with an embodiment of the present invention.

FIG. 2 is a flowchart 200 depicting operational steps of lightweight application virtualization program 112, for lightweight application virtualization based on policies defined by overlaying geofence(s) for an edge device used in multiple applications. It should be appreciated that the process depicted in FIG. 3 illustrates one possible iteration of lightweight application virtualization program 112.

In an example embodiment, an edge robotic arm is the edge device that is used for multiple applications within an industrial spatial area. In an assembling area, the edge robotic arm is involved in welding and drilling. In a warehousing area, the edge robotic arm is used in material handling and material stacking. In a painting area, the edge robotic arm is used for thermal spraying and painting. In a quality check area, the edge robotic arm is used for inspection and product grading. As the steps of lightweight application virtualization program 112 are described, this example embodiment of the edge robotic arm will be used to further describe each step.

In step 210, lightweight application virtualization program 112 collects real-time data of one or more geofences of a specified geospatial area. In an embodiment, lightweight application virtualization program 112 collects real-time data of one or more geofences of a specified geospatial area, in which each geofence is associated with one or more policies that define the behavior and constraints for edge devices and their applications within a respective geofence. The real-time data may include, but is not limited to, coordinates of the one or more geofences, a type of each of the one or more geofences (e.g., dynamic, static, time-based, integrated (i.e., combining one or more geofences)), installed policies of each of the one or more geofences (which can be changed anytime, e.g., time-based policies), number of edge devices or edge ecosystems (nodes, gateways) within each geofence, number of operating devices within a geofence, and any data exchange aspects related to the edge devices (e.g., type of data sharing between the edge devices, type of operation, network data, etc.).

For the edge robotic arm example, lightweight application virtualization program 112 collects real-time data of one or more geofences of the industrial spatial area. In an embodiment, lightweight application virtualization program 112 identifies a geofence for the assembling area, the warehousing area, the painting area, and the quality check area, each with one or more policies defined for the specific area. Some of these areas within the industrial spatial area, and the related geofences, overlap creating overlapping and/or layering geofences.

In step 220, lightweight application virtualization program 112 determines hierarchy of the one or more geofences. In an embodiment, lightweight application virtualization program 112 determines hierarchy of the overlapping and/or layering one or more geofences based on the collected real-time data. In an embodiment, lightweight application virtualization program 112 determines hierarchy based on an arrangement of geofence layers of the one or more geofences and any priority/precedence key associated to the one or more geofences, otherwise a default precedence is assumed based on the arrangement of geofence layers of the one or more geofences.

In step 230, lightweight application virtualization program 112 determines applicable set of geofence policies. In an embodiment, lightweight application virtualization program 112 determines applicable set of geofence policies based, at least in part, on the hierarchy of the one or more geofences and associated rules/policies for each of the one or more geofences. In an embodiment, lightweight application virtualization program 112 determines applicable set of geofence policies based on the number of geofences acting on the specified geospatial area or a subregion of the specified geospatial area; the hierarchy of one or more geofences and associated rules/policies for each of the one or more geofences; the precedence of the policies based on the hierarchy when one or more of the policies have conflict of interest; and any General Data Protection Regulation (GDPR) and data privacy rules in the specified geospatial area.

In step 240, lightweight application virtualization program 112 generates edge-based policies for an edge device based on the applicable set of geofence policies. Edge-based policies define dynamic containerization of applications and functionality specific to the area (geofence) the edge device is located in. For example, when the edge robotic arm is in the assembling area, lightweight application virtualization program 112 dynamically generates edge-based policies in adherence to the applicable one or more policies of the geofence the assembling area is within. For the edge robotic arm examples, the edge-based policies provide control over interfaces such as reading and writing to the edge robotic arm as well as execution of methods offered by the edge robotic arm corresponding to the assembling area (geofence).

In step 250, lightweight application virtualization program 112 creates corresponding orchestration protocols on the edge device based on the edge-based policies. In an embodiment, lightweight application virtualization program 112 creates orchestration protocols for an edge device based on the generated edge-based policies. Orchestration involves multiple aspects for container management including, but not limited to, security, deployment, data sharing protocols/rules, personal information or sensitive personal information management, GDPR and data anonymization, workload balancing and routing of incoming traffic, resource allocation, container provisioning, destruction of container, templating base containers, container health diagnosis, configuration and scheduling containers, storage, clustering/cluster administration, network management (e.g., certificate installing, upgrades, protocols, TLS, etc.), and fault diagnosis. For example, lightweight application virtualization program 112 dynamically conducts fault and performance diagnosis and tolerance of the edge robotic arm and corresponding assembling area work and applications, which comprise a plurality of microservices, based on the created orchestration protocols for the edge robotic arm.

In some embodiments, lightweight application virtualization program 112 dynamically enables autonomous deletion of an edge device and its application when the edge device is moved out of the at least one of the one or more geofences or when at least one of the one or more geofences are dynamically dropped. For example, when the edge robotic arm is moved out of the assembling area and into the warehousing area, lightweight application virtualization program 112 performs an auto-deletion or truncation of the containerized application or functionalities defined by the geofence policies of the assembling area, freeing up much needed edge resources, and repeats steps 220 and 230 in accordance with the warehousing area and application for the edge robotic arm.

FIG. 3 depicts a block diagram of components of computing device 300, suitable for server 110 running lightweight application virtualization program 112 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
collecting, by one or more processors, real-time data of one or more geofences of a specified geospatial area;
determining, by one or more processors, a hierarchy of the one or more geofences based on the collected real-time data;
determining, by one or more processors, an applicable set of geofence policies based, at least in part, on the hierarchy of the one or more geofences;
generating, by one or more processors, edge-based policies for an edge device based on the applicable set of geofence policies;
creating, by one or more processors, corresponding orchestration protocols on the edge device based on the edge-based policies; and
responsive to the edge device moving out of at least one of the one or more geofences, dynamically adjusting, by the one or more processors, an application of the edge device defined by the edge-based policies.

2. The computer-implemented method of claim 1, wherein the real-time data is selected from the group consisting of coordinates of the one or more geofences, a type of each of the one or more geofences, installed policies for each of the one or more geofences, number of edge devices within each of the one or more geofences, and data exchange aspects related to each edge device.

3. The computer-implemented method of claim 1, wherein at least one of the one or more geofences overlaps another one of the one or more geofences.

4. The computer-implemented method of claim 1, wherein the hierarchy is further based on an arrangement of the one or more geofences and a precedence key associated with the one or more geofences, otherwise a default precedence is assumed based on the arrangement of the one or more geofences.

5. The computer-implemented method of claim 1, wherein the edge-based policies define dynamic containerization of applications and functionality specific to the one or more geofences the edge device is located within.

6. The computer-implemented method of claim 1, further comprising:
dynamically conducting, by one or more processors, fault and performance diagnosis of the edge device and corresponding applications based on the created orchestration protocols for the edge device.

7. The computer-implemented method of claim 1, further comprising:
dynamically enabling, by one or more processors, autonomous deletion of the edge device and application of the edge device when the edge device is moved out of at least one of the one or more geofences or when at least one of the one or more geofences are dynamically dropped.

8. A computer program product comprising:
one or more computer readable storage media and program instructions collectively stored on the one or more computer readable storage media, the stored program instructions comprising:
program instructions to collect real-time data of one or more geofences of a specified geospatial area;
program instructions to determine a hierarchy of the one or more geofences based on the collected real-time data;
program instructions to determine an applicable set of geofence policies based, at least in part, on the hierarchy of the one or more geofences;
program instructions to generate edge-based policies for an edge device based on the applicable set of geofence policies;
program instructions to create corresponding orchestration protocols on the edge device based on the edge-based policies; and
program instructions to responsive to the edge device moving out of at least one of the one or more geofences, dynamically adjust an application of the edge device defined by the edge-based policies.

9. The computer program product of claim 8, wherein the real-time data is selected from the group consisting of coordinates of the one or more geofences, a type of each of the one or more geofences, installed policies for each of the one or more geofences, number of edge devices within each of the one or more geofences, and data exchange aspects related to each edge device.

10. The computer program product of claim 8, wherein at least one of the one or more geofences overlaps another one of the one or more geofences.

11. The computer program product of claim 8, wherein the hierarchy is further based on an arrangement of the one or more geofences and a precedence key associated with the one or more geofences, otherwise a default precedence is assumed based on the arrangement of the one or more geofences.

12. The computer program product of claim 8, wherein the edge-based policies define dynamic containerization of applications and functionality specific to the one or more geofences the edge device is located within.

13. The computer program product of claim 8, further comprising:
program instructions to dynamically conduct fault and performance diagnosis of the edge device and corresponding applications based on the created orchestration protocols for the edge device.

14. The computer program product of claim 8, further comprising:
program instructions to dynamically enable autonomous deletion of the edge device and application of the edge device when the edge device is moved out of at least one of the one or more geofences or when at least one of the one or more geofences are dynamically dropped.

15. A computer system comprising:
one or more computer processors;
one or more computer readable storage media;
program instructions collectively stored on the one or more computer readable storage media for execution by at least one of the one or more computer processors, the stored program instructions comprising:
program instructions to collect real-time data of one or more geofences of a specified geospatial area;
program instructions to determine a hierarchy of the one or more geofences based on the collected real-time data;
program instructions to determine applicable set of geofence policies based, at least in part, on the hierarchy of the one or more geofences;
program instructions to generate edge-based policies for an edge device based on the applicable set of geofence policies;

program instructions to create corresponding orchestration protocols on the edge device based on the edge-based policies; and program instructions to responsive to the edge device moving out of at least one of the one or more geofences, dynamically adjust an application of the edge device defined by the edge-based policies.

16. The computer system of claim 15, wherein the real-time data is selected from the group consisting of coordinates of the one or more geofences, a type of each of the one or more geofences, installed policies for each of the one or more geofences, number of edge devices within each of the one or more geofences, and data exchange aspects related to each edge device.

17. The computer system of claim 15, wherein at least one of the one or more geofences overlaps another one of the one or more geofences.

18. The computer system of claim 15, wherein the hierarchy is further based on an arrangement of the one or more geofences and a precedence key associated with the one or more geofences, otherwise a default precedence is assumed based on the arrangement of the one or more geofences.

19. The computer system of claim 15, wherein the edge-based policies define dynamic containerization of applications and functionality specific to the one or more geofences the edge device is located within.

20. The computer system of claim 15, further comprising:
program instructions to dynamically enable autonomous deletion of the edge device and application of the edge device when the edge device is moved out of at least one of the one or more geofences or when at least one of the one or more geofences are dynamically dropped.

* * * * *